United States Patent [19]

Barton

[11] 3,971,274

[45] July 27, 1976

[54] VARIABLE ANGLE CUT-OFF SAW

[76] Inventor: Glenn B. Barton, P.O. Box 127, Calhoun City, Miss. 38916

[22] Filed: Apr. 15, 1975

[21] Appl. No.: 568,186

[52] U.S. Cl. .................................. 83/100; 83/464; 83/468; 83/471.3; 83/477.1
[51] Int. Cl.² ........................................ B26B 11/10
[58] Field of Search ............... 83/471.3, 471.2, 473, 83/472, 477.1, 477, 486.1, 100, 464, 467, 468

[56] References Cited
UNITED STATES PATENTS

| | | | |
|---|---|---|---|
| 1,644,887 | 10/1927 | Mansfield | 83/486.1 X |
| 2,655,955 | 10/1953 | Dziengiel, Jr. | 83/486.1 X |
| 3,195,591 | 7/1965 | Haberman | 83/477.1 X |
| 3,322,169 | 5/1967 | Hilliard | 83/100 X |
| 3,853,028 | 12/1974 | Jagers | 83/471.3 X |
| 3,872,755 | 3/1975 | Marsh et al. | 83/471.3 |

Primary Examiner—J. M. Meister
Attorney, Agent, or Firm—Clarence A. O'Brien; Harvey B. Jacobson

[57] ABSTRACT

An elongated horizontal workpiece support is provided and an elongated lower support arm extends transversely beneath and is oscillatably supported, centrally intermediate its opposite ends, from the longitudinal central portion of the workpiece support. One end of the support arm includes an upright standard supported therefrom and projecting upwardly above the workpiece support. An upper support arm is secured at one end from the upper end portion of the standard and extends over the workpiece support and generally parallels the lower support arm disposed beneath the workpiece support. A depending mount is slidably mounted on the upper support arm for guided movement therealong and a powered rotary saw blade is journaled from a lower portion of the depending mount with the saw blade disposed in an upright plane containing the upper support arm. The end of the lower support arm remote from the standard and the corresponding side of the elongated workpiece support include coacting structure operable to releasably secure the lower support arm in angularly adjusted displaced positions relative to the workpiece support. Further, the longitudinal side of the elongated workpiece support adjacent the standard includes an upwardly projecting abutment extending along the workpiece support and adapted to have the adjacent side of a workpiece supported on the workpiece support and extending therealong abutted thereagainst. The workpiece support includes a longitudinal central portion adapted to be traversed by the saw blade and the side of the workpiece support remote from the standard includes upwardly projecting abutment members spaced along the workpiece support on opposite sides of the central portion independently adjustable transversely of the workpiece support toward and away from the abutment means extending along the side of the workpiece support adjacent the standard.

5 Claims, 8 Drawing Figures

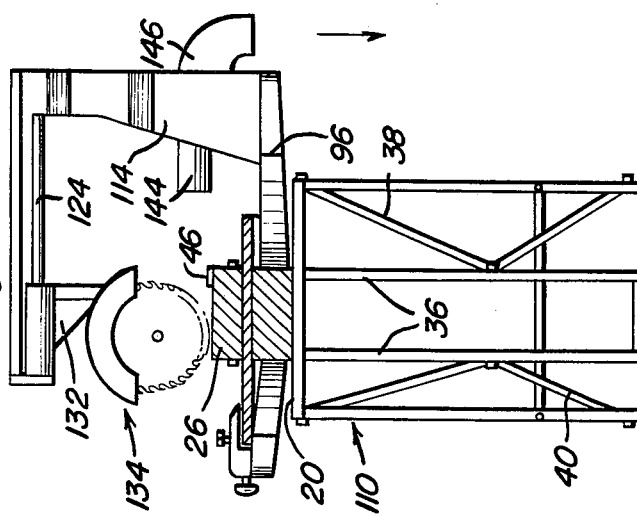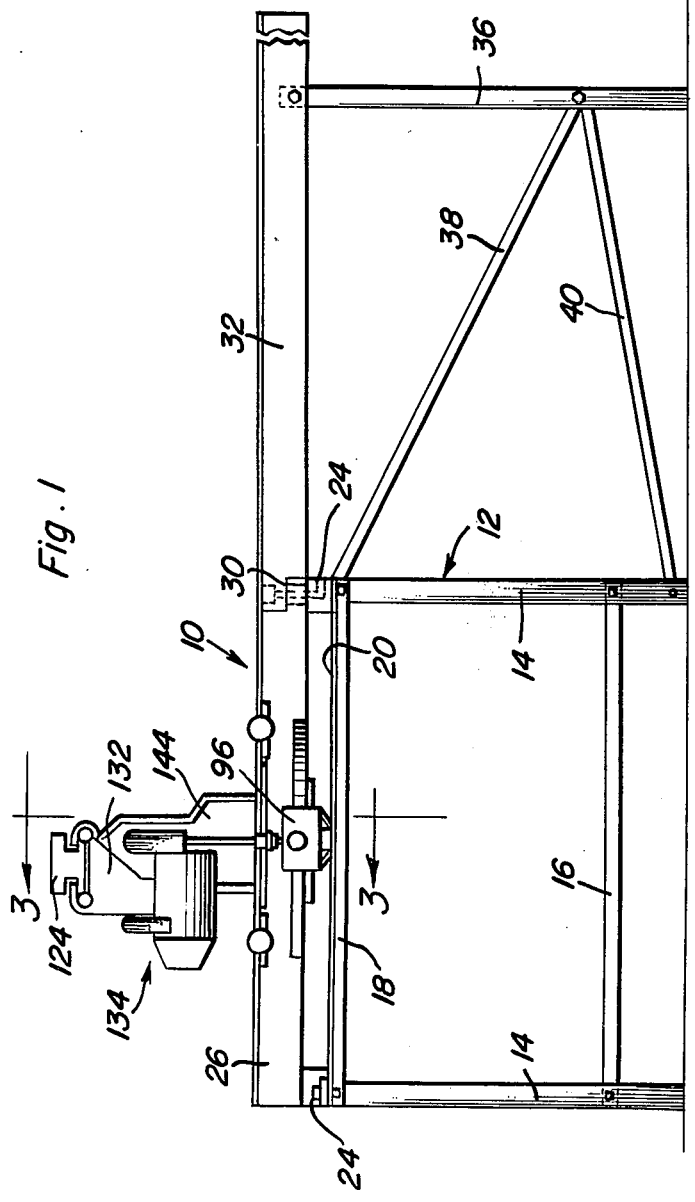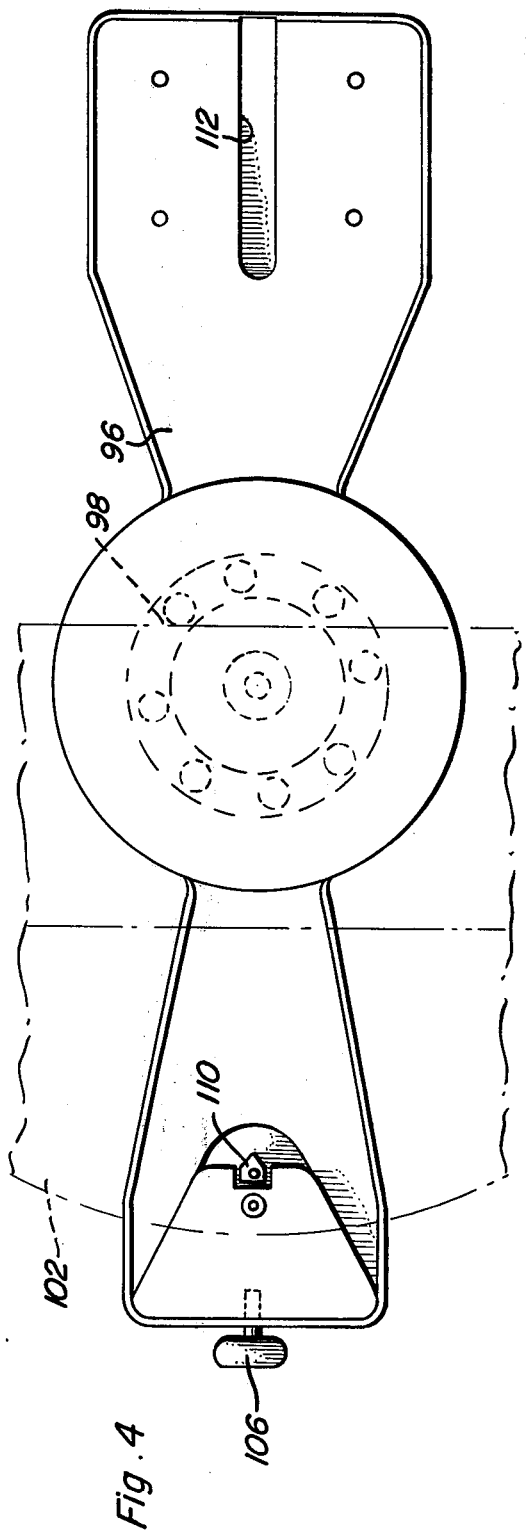

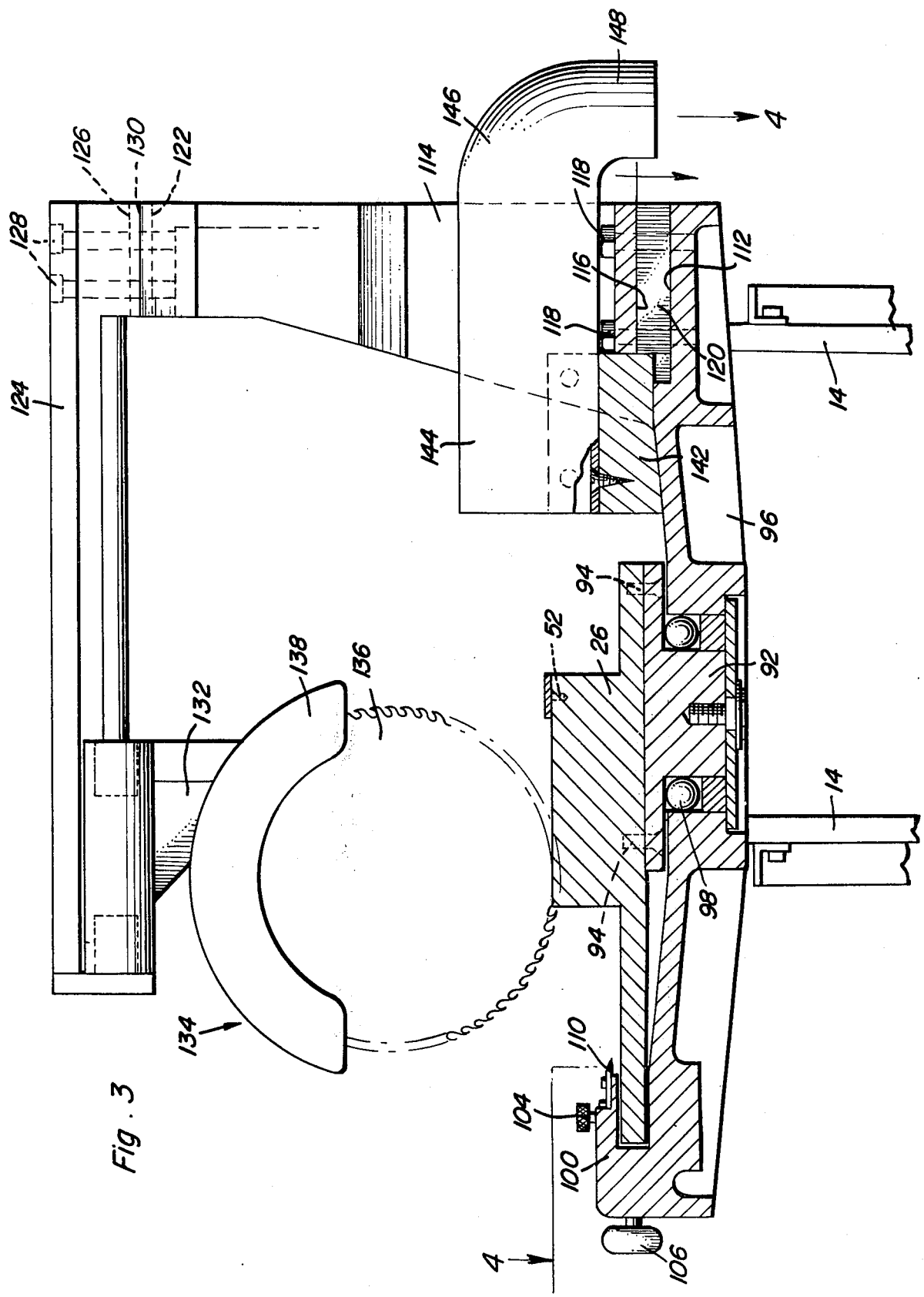

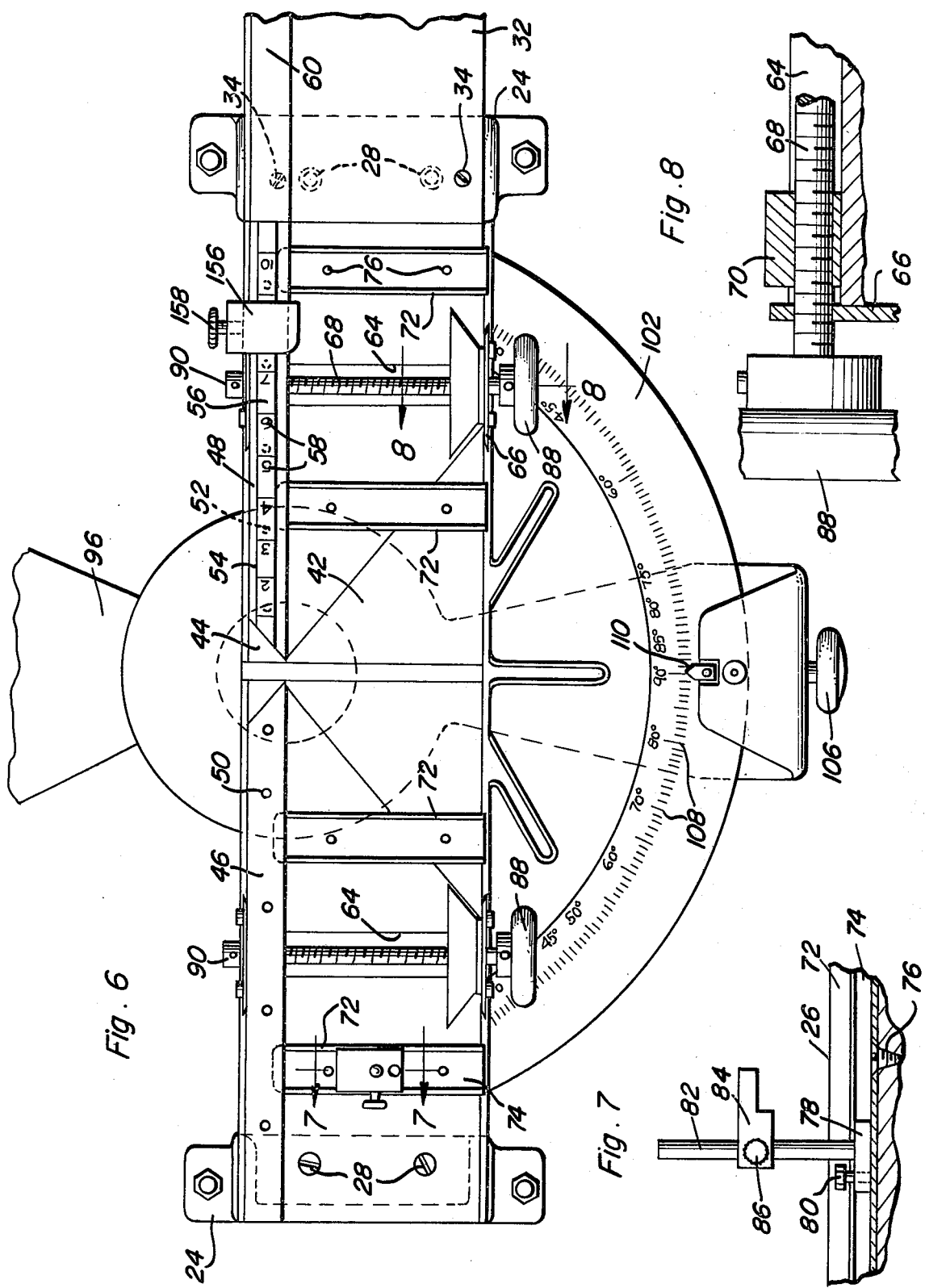

VARIABLE ANGLE CUT-OFF SAW

BACKGROUND OF THE INVENTION

Heretofore various forms of variable angle cut-off saws have been designed but few have been constructed in a manner so as to be capable of producing precise cutting operations and at the same time be extremely convenient to use as well as operable to stationarily secure various shapes of workpieces in the desired position for a cut-off operation. Examples of previously patented cut-off saws including some of the structural features of the instant invention are disclosed in U.S. Pat. Nos. 473,429, 2,175,907, 2,633,162, 2,973,020 and 3,384,135.

SUMMARY OF THE INVENTION

The variable angle cut-off saw of the instant invention is constructed in a manner whereby precise cut-off operations may be performed at angles varying from between 40° to 90°. Corresponding angle cuts may be formed on opposite ends of the same workpiece, if desired, and different angle cuts may be formed on opposite ends of the same workpiece. Further, the cut-off saw of the instant invention is constructed in a manner whereby reasonably unskilled labor may quickly become quite efficient in performing cut-off operations and the various controls of the saw are readily accessible from the front side thereof.

The main object of this invention is to provide a variable angle cut-off saw including means by which precise angle cut-off operations may be performed.

Another object of this invention is to provide a cut-off saw which may be utilized to perform cut-off operations on various types of material such as plastic, wood and metal, etc.

Still another important object of this invention is to provide a cut-off saw provided with workpiece hold-down structure whereby the workpiece upon which the cut-off operation is being performed may be securely held in the precise position desired during the cut-off operation.

Another important object of this invention is to provide a cut-off saw which will require but a simple instructional period and a minimum amount of practice before a relatively unskilled person may be proficient in the utilization of the cut-off saw.

An ancillary object of this invention is to provide a cut-off saw in accordance with the preceding objects and constructed in a manner whereby the operating controls of the saw are substantially all located on the front side of the saw adjacent the operator thereof.

Yet another object of this invention is to provide a variable angle cut-off saw which may be quickly adjusted to perform different angle cuts in succession.

A final object of this invention to be specifically enumerated herein is to provide a variable angle cut-off saw in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a front elevational view of the cut-off saw and with the right hand portion thereof provided with an extension therefor;

FIG. 2 is an end elevational view of the assemblage illustrated in FIG. 1 as seen from the right side thereof and with the central portion of the longitudinally extending workpiece support structure illustrated in vertical transverse section;

FIG. 3 is an enlarged fragmentary vertical sectional view taken substantially upon the plane indicated by the section line 3—3 of FIG. 1;

FIG. 4 is a fragmentary horizontal sectional view taken substantially upon the plane indicated by the section line 4—4 of FIG. 3;

FIG. 6 is a fragmentary horizontal plan view of the elongated horizontal workpiece support portion of the cut-off saw as seen from immediately above the plane of the workpiece support illustrated in FIG. 5;

FIG. 7 is an enlarged fragmentary transverse vertical sectional view taken substantially upon the plane indicated by the section line 7—7 of FIG. 6; and FIG. 8 is an enlarged fragmentary transverse vertical sectional view taken substantially upon the plane indicated by the section line 8—8 of FIG. 6.

DETAILED DESCRIPTION OF THE INVENTION

Figure 5:
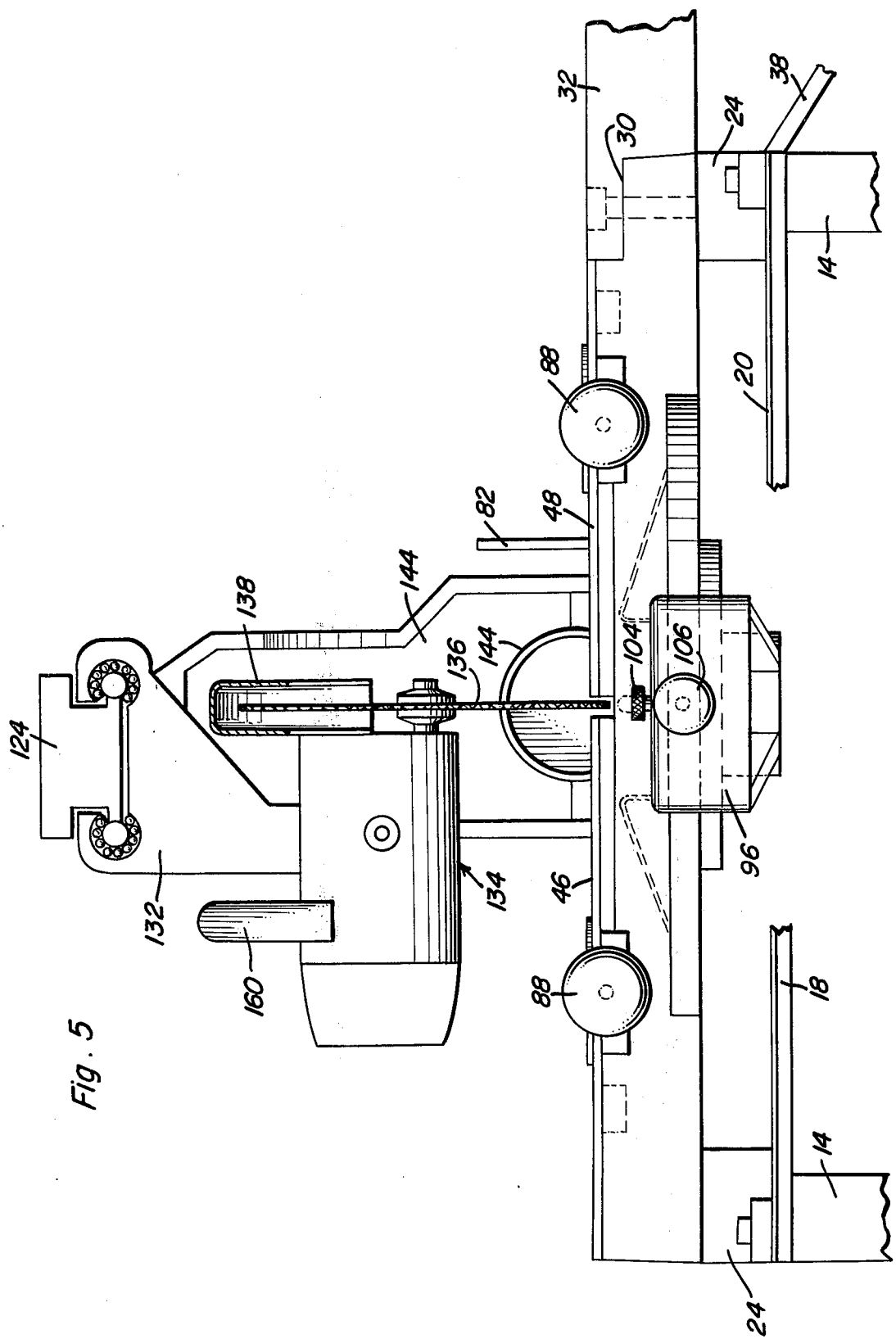
FIG. 5 is an enlarged front elevational view of the cut-off saw with lower portions of the stand or table therefor being broken away and a portion of the shield for the saw blade illustrated in vertical section.

Referring now more specifically to the drawings the numeral 10 generally designates the cut-off saw of the instant invention. The saw 10 includes a support table referred to in general by the reference numeral 12 and consisting of two longitudinally spaced pairs of front and rear upstanding legs 14 interconnected by means of longitudinal brace members 16 extending and secured between the lower ends of corresponding legs 14 as well as upper longitudinal brace members 18 extending and secured between the upper ends of corresponding legs 14. A table 20 is supported from and interconnects the upper ends of the legs 14 and a pair of mounting brackets 24 are secured to the upper portions of the opposite ends of the table 20 and have the opposite ends of a horizontally elongated and longitudinally extending workpiece support 26 secured thereto by means of suitble fasteners 28 recessed downwardly in the opposite ends of the workpiece support 26 and threaded into the upper portions of the mounting brackets 24. The right hand end of the workpiece support 26 as illustrated in FIG. 1 is stepped as at 30 and one end of an extension 32 is oppositely stepped and secured over the stepped portion 30 by means of suitable fasteners 34. The right hand end of the extension 32 is supported by a pair of opposite side legs 36 and suitable angle bracing 38 and 40 is connected between the legs 36 and the corresponding adjacent legs 14.

The longitudinal central portion of the upper surface of the workpiece support 26 is provided with two interconnecting triangular relieved areas 42 and 44 and a pair of workpiece stop defining strips 46 and 48 are secured along the rear marginal edge of the upper surface of the workpiece support 26 on opposite sides of the relieved area 44 by means of suitable fasteners 50 and 52. The strip 48 has a shallow upwardly opening groove 54 formed therein in which a suitable measuring strip 56 is secured in any convenient manner over the upper ends of the fasteners 52, the measuring strip 56 having measuring indicia 58 thereon, and the rear marginal edge of the extension 32 having a strip 60 corresponding to the strips 46 and 48 secured thereto.

With attention now invited more specifically to FIGS. 6 and 8 of the drawings it will be seen that the upper surface of the workpiece support 26 includes a pair of upwardly opening grooves 64 formed transversely therethrough and that the opposite ends of the grooves 64 are closed by means of plates 66 secured to the corresponding side edges of the workpiece support 26. Each pair of corresponding plates 66 rotatably receives the opposite ends of an adjusting screw 68 therethrough and each of the grooves 64 has an abutment block 70 slidably disposed therein for movement therealong and through which the corresponding screw 68 is threadedly engaged. Further, the upper surface of the workpiece support 26 has additional upwardly opening transverse grooves 72 formed therein and a channel member 74 is secured in each groove 72 by means of suitable fasteners 76 with the opposite ends of the channel members 74 opening endwise outwardly of the corresponding ends of the grooves 72. At least one support block 78, see FIG. 7, is provided and is removably slidingly received in either of the channel members 74. The support block 78 includes a setscrew 80 threadedly engaged therewith for engagement with the bottom of the corresponding channel member 74 in order to retain the block 78 in adjusted position in the channel 74 and the block 78 includes an upwardly projecting standard 82 of cylindrical configuration upon which a hold-down block 84 is mounted for sliding movement therealong, the hold-down block 84 including a setscrew 86 threadedly engaged therewith operable to engage the standard 82 and retain the hold-down block in adjusted position along the standard 82.

Each of the adjusting screws 68 for the abutment blocks 70 has a handwheel 88 mounted on its forward end and the rear end portion of each screw 68 includes a diametrically reduced portion rotatably received through the corresponding plate 66 and secured therethrough by means of an enlargement 90 secured on the terminal end of the screw 68 projecting beyond the corresponding rear plate 66.

The longitudinal central portion of the workpiece support 26 has a journal structure 92 secured to the underside thereof by means of suitable fasteners 94 and the longitudinal mid-portion of a lower support arm 96 is journaled on the journal portion 92 by means of a combined thrust and journal bearing 98.

The forward end of the lower support arm 96 includes a lip portion 100 which overlies a forward sector portion 102 of the front side of the central portion of the workpiece support 26. The lip portion 100 includes a setscrew 104 threadedly engaged therewith and which may be tightened against the sector portion 102 in order to retain the lower support arm 96 in adjusted angularly displaced positions relative to the workpiece support 26. In addition, the forward extremity of the lower support arm 96 includes an outwardly projecting control knob 106 which may be grasped and utilized to swing the lower support arm 96 relative to the workpiece support 26 when the setscrew 104 is loosened.

The sector portion 102 includes angle indicating indicia 108 with which a center portion 110 carried by the lip portion 100 is registrable. Also, the rear end of the lower support arm 96 includes a keyway 112 and the lower end of a standard 114 provided with a similar but downwardly opening keyway 116 is secured on the rear end of the lower support arm 96 by means of fasteners 118 and a key 120 whose lower and upper portions are received in the keyways 112 and 116, respectively.

The upper end of the standard 114 includes an upwardly opening keyway 122 and the rear end of an upper support arm 124 includes a downwardly opening keyway 126, suitable fasteners 128 and a key 130 being utilized to secure the rear end of the upper support arm 124 to the upper end of the standard 114.

A depending follower 132 is mounted on the upper support arm 124 for movement therealong and the lower end of the follower 132 includes an electric rotary saw assembly referred to in general by the reference numeral 134 supported therefrom for limited vertical adjustment relative to the follower 132. The assembly 134 includes a rotary saw blade 136 disposed in a vertical plane which substantially parallels the upper and lower support arms 124 and 96 and the upper periphery of the saw blade 136 is enclosed within a downwardly opening guard 138 as is conventional.

The lower periphery of the saw blade 136 is received downwardly within the recessed portions 42 and 44 and the lower support arm 96, and thus the upper support arm 124 and the saw assembly 134 may be angularly displaced 50° relative to and on opposite sides of a position with the support arms 96 and 124 disposed substantially normal to the longitudinal centerline of the workpiece support 26.

A saddle structure 142 is supported from the rear end of the lower support arm 96, see FIG. 3 and supports the intake end 144 of a tubular member 146 having a downwardly directed outlet end 148 disposed to the rear of the lower support arm 96 and adapted to be sealingly communicated with a source of vacuum. The inlet end of the tubular member 146 opens directly toward the lower peripheral portion of the saw blade 136 and the saw blade 136, when in operation, turns in a counterclockwise direction as viewed in FIG. 3 of the drawings so that cuttings being generated by a cut-off operation are discharged immediately toward the inlet end 144 of the tubular member 146.

In operation, the height of the electric rotary saw assembly 134 relative to the follower 132 is adjusted in accordance with the diameter of the saw blade 136 so that the lower periphery of the saw blade 136 will project down into the recessed portions 42 and 44 upon movement of the follower 132 along the upper support arm 124. However, the lower periphery of the saw blade 136 is to be slightly spaced above the lower extremities of the recessed portions 42 and 44. Then, the setscrew 104 is loosened and the lower support arm 96 is swung to the correct position with the pointer 110 registered with the desired indicia 108. Thereafter, the setscrew 104 is tightened to secure the lower support arm 96 in its adjusted position. Thereafter, the assembly 134 is shifted rearwrdly to be disposed to the rear of the strips 44 and 48 and a workpiece to be cut off is placed upon the upper surface of the workpiece support 26 with the rear edge of the workpiece against the front edges of the strips 46 and 48. In addition, if the workpiece to be cut off is to be relatively short, a downwardly opening channel-shaped abutment block 156 is slipped over the strip 48 and secured in adjusted position thereon by means of a setscrew 158 and one end of the workpiece to be cut may be abutted against the block 156 after its position along the strip 48 has been adjusted. Then, with the workpiece properly longitudinally positioned along the workpiece support 26 and the angular position of the lower support arm 96 relative to the workpiece support properly adjusted, the handle 160 of the assembly 134 may be grasped and the actuating trigger (not shown) therefor may be squeezed in order to place the assembly 134 in operation. Then, the assembly 134 is pulled forwardly from the rearwardly displaced position thereof in order that the blade 136 may make the proper angle cut-off. If it is desired, the work hold-down block 84 may be utilized either singly or in combination with additional similar work hold-down blocks 84 and it may therefore be seen that a workpiece being cut may be properly secured in position for a precise cutting operation.

The foregoing is considered as illustrative only of the principles of the invention. Further, since numerous modification and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination, an elongated horizontal workpiece support, an elongated lower support arm extending transversely beneath said workpiece support centrally intermediate its opposite ends and with the central portion of said support arm oscillatably supported from said workpiece support for swinging of said support arm about an upright axis relative to said workpiece support, one end of said support arm including an upright standard supported therefrom projecting upwardly above said workpiece support, an upper support arm secured at one end from the upper end portion of said standard and extending over said workpiece support and generally paralleling said lower support arm, a depending mount slidably mounted on said upper support arm for guided movement therealong and a powered rotary saw blade journaled from a lower portion of said mount and disposed in an upright plane containing said upper support arm, the longitudinal side of said elongated workpiece support adjacent said standard including upwardly projecting abutment means extending along said workpiece support and adapted to have the adjacent side of a workpiece supported on said workpiece support and extending therealong abutted thereagainst, said elongated workpiece support including a longitudinal central portion adapted to be traversed by said saw blade, the longitudinal side of said workpiece support remote from said standard including upwardly projecting abutment members spaced along said workpiece support on opposite sides of said central portion screw threadedly mounted from said workpiece support for independent adjustment transversely of the latter toward and away from said abutment means, longitudinally spaced portions of said elongated workpiece support including upright support means spaced along said workpiece support and supported therefrom on opposite sides of said central portion for independent adjustable transverse shifting relative to said workpiece support member, releasably securable in adjusted positions and having workpiece hold-down members mounted thereon for independent adjustable vertical shifting therealong, and means operative to releasably secure said hold-down members in adjusted vertically shifted positions.

2. The combination of claim 1 wherein the other end of said lower support arm and the corresponding side of said workpiece support include coacting means operative to releasably secure said lower support arm in adjusted angularly displaced position relative to said workpiece support.

3. The combination of claim 1 wherein said workpiece support member, on said side adjacent said standard and on one side of said central portion, includes a transversely projecting abutment member mounted on said workpiece support member for adjustable shifting longitudinally of said workpiece support member.

4. The combination of claim 3 wherein the other end of said lower support arm and the corresponding side of said workpiece support include coacting means operative to releasably secure said lower support arm in adjusted angularly displaced position relative to said workpiece support.

5. The combination of claim 1 wherein the lower portion of said standard includes the inlet end of a tube member in horizontal alignment with and opening toward the lower periphery of said saw blade, said tube member including an outlet end adapted for sealed communication with the inlet of a vacuum source.

* * * * *